United States Patent
Shimauchi (10) Patent No.: US 12,358,346 B2
(45) Date of Patent: Jul. 15, 2025

(54) AIR CONDITIONING DEVICE FOR VEHICLE

(71) Applicant: TOYOTA JIDOSHA KABUSHIKI KAISHA, Aichi-ken (JP)

(72) Inventor: Takayuki Shimauchi, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 173 days.

(21) Appl. No.: 18/446,473

(22) Filed: Aug. 9, 2023

(65) Prior Publication Data

US 2024/0051373 A1    Feb. 15, 2024

(30) Foreign Application Priority Data

Aug. 12, 2022    (JP) ................... 2022-129022

(51) Int. Cl.
   *B60H 1/26*     (2006.01)
   *B60H 1/00*     (2006.01)
   *B60H 1/24*     (2006.01)

(52) U.S. Cl.
   CPC ........... *B60H 1/26* (2013.01); *B60H 1/00821* (2013.01); *B60H 1/00899* (2013.01); *B60H 1/246* (2013.01)

(58) Field of Classification Search
   CPC .. B60H 1/26; B60H 1/00821; B60H 1/00899; B60H 1/246; B60H 1/00849; B60H 2001/2228; B60H 2001/00135
   See application file for complete search history.

(56) References Cited

U.S. PATENT DOCUMENTS

| | | | | |
|---|---|---|---|---|
| 2002/0134540 A1* | 9/2002 | Ieda | ................... | B60H 1/00842 165/204 |
| 2008/0245504 A1* | 10/2008 | Eisenhour | .......... | B60H 1/00849 165/43 |
| 2011/0109157 A1* | 5/2011 | Tani | ................... | B60H 1/00735 60/660 |
| 2012/0000210 A1* | 1/2012 | Kim | ..................... | F04B 49/065 62/133 |

(Continued)

FOREIGN PATENT DOCUMENTS

| JP | H08-268035 A | 10/1996 |
|---|---|---|
| JP | H09-175140 A | 7/1997 |

(Continued)

*Primary Examiner* — Nelson J Nieves
(74) *Attorney, Agent, or Firm* — HAUPTMAN HAM, LLP (57) ABSTRACT

In an outside air mode, outside air introduced through an outside air introducing opening is introduced into a ventilation duct. In an inside air mode, inside air introduced through an inside air introducing opening is introduced into the ventilation duct. In an inside and outside air mixture mode, the outside air introduced through the outside air introducing opening and the inside air introduced through the inside air introducing opening are both introduced into the ventilation duct. When the interior of the vehicle is heated in the inside air mode or in the inside and outside air mixture mode, the control unit executes control such that all of the air to be blown out through the blowing opening has passed through the heater core, and sets the temperature of the heating medium in the heating system in accordance with the temperature of the air passing through the evaporator.

1 Claim, 5 Drawing Sheets

(56) References Cited

U.S. PATENT DOCUMENTS

| | | | |
|---|---|---|---|
| 2015/0183291 A1* | 7/2015 | Higuchi | B60H 1/00392 |
| | | | 62/133 |
| 2017/0036514 A1* | 2/2017 | Umehara | B60H 1/00885 |
| 2019/0047358 A1* | 2/2019 | Kong | B60H 1/00742 |
| 2019/0193522 A1 | 6/2019 | Takeuchi et al. | |
| 2019/0225189 A1* | 7/2019 | Maeda | B60H 1/00849 |
| 2023/0001762 A1* | 1/2023 | Hoshino | B60H 1/00021 |
| 2023/0040086 A1* | 2/2023 | Park | B60H 1/00842 |
| 2023/0150337 A1* | 5/2023 | Zhang | B60H 1/00685 |
| | | | 165/202 |
| 2024/0116330 A1* | 4/2024 | Kim | B60H 1/00864 |
| 2024/0149635 A1* | 5/2024 | Ling | B60H 1/00849 |
| 2024/0174053 A1* | 5/2024 | Kim | B60H 1/00921 |

FOREIGN PATENT DOCUMENTS

| | | |
|---|---|---|
| JP | 2000-313224 A | 11/2000 |
| JP | 2010-095229 A | 4/2010 |
| JP | 2010-143533 A | 7/2010 |
| JP | 2019-115128 A | 7/2019 |

\* cited by examiner

AIR CONDITIONING DEVICE FOR VEHICLE

CROSS REFERENCE TO RELATED APPLICATION

This application claims priority to Japanese Patent Application No. 2022-129022 filed on Aug. 12, 2022, which is incorporated herein by reference in its entirety including the specification, claims, drawings, and abstract.

TECHNICAL FIELD

The present disclosure relates to an air conditioning device for a vehicle including a heater.

BACKGROUND

Conventional gasoline engine vehicles and hybrid vehicles conduct heating, utilizing waste heat from the engine. When running as a pure electric vehicle, pure electric vehicles and hybrid cars cannot utilize waste heat from the engine. To address the above, such vehicles use heat absorbed from the outside air, or heating with a heater as a heating source, utilizing a heating pump for cooling. JP2010-143533A describes heating that is conducted utilizing a heating pump.

Also in a case of using a heater, the temperature for heating with the heater is set relatively high, similar to a case of using waste heat from an engine, and the temperature for blowing air is controlled by controlling the amount of heat exchange at the heater.

A heating source, such as a heater, uses power from a battery. Inefficient use of the heater may increase the cost for a given traveled distance, or reduce the travelling distance which the vehicle can run.

SUMMARY

The present disclosure provides an air conditioning device for a vehicle that can efficiently use a heater.

According to one aspect of the present disclosure, there is provided an air conditioning device for a vehicle, including a heat pump system for circulating a heating medium through an evaporator and a condenser; a heating system for circulating the heating medium through a heater and a heater core; a ventilation duct having the evaporator and the heating core disposed therein, and further having an introducing opening formed on one end thereof and a blowing opening formed on another end thereof so that air having been introduced through the introducing opening is blown out through the blowing opening; and a control unit for controlling the temperature of the heating medium in the heating system, wherein the introducing opening includes an outside air introducing opening for introducing air outside the cabin of the vehicle and an inside air introducing opening for introducing air in the inside of the cabin of the vehicle, the outside air introduced through the outside air introducing opening is introduced into the ventilation duct in an outside air mode, the inside air introduced through the inside air introducing opening is introduced into the ventilation duct in an inside air mode, the outside air introduced through the outside air introducing opening and the inside air introduced through the inside air introducing opening are both introduced into the ventilation duct in an inside and outside air mixture mode, and in heating the inside of the cabin of the vehicle in either the inside air mode or the inside and outside air mixture mode, the control unit executes control such that all of the air to be blown out through the blowing opening passes through the heater core, and sets the temperature of the heating medium in the heating system in accordance with the temperature of the air passing through the evaporator.

According to an air conditioning device for a vehicle according to the present disclosure, the temperature of a heating medium of a heating system is set in accordance with the temperature of the inside air. This enables use of a heating system including a heater with an appropriate power consumption, and thus ensures a longer traveling distance of a vehicle.

BRIEF DESCRIPTION OF DRAWINGS

Embodiment(s) of the present disclosure will be described based on the following figures, wherein.

DESCRIPTION OF EMBODIMENTS

With reference to the accompanying drawings, an embodiment of the present disclosure will now be described. The following example does not limit the present disclosure. The present disclosure includes a structure resulting from selective combination of a plurality of examples.

Figure 1:
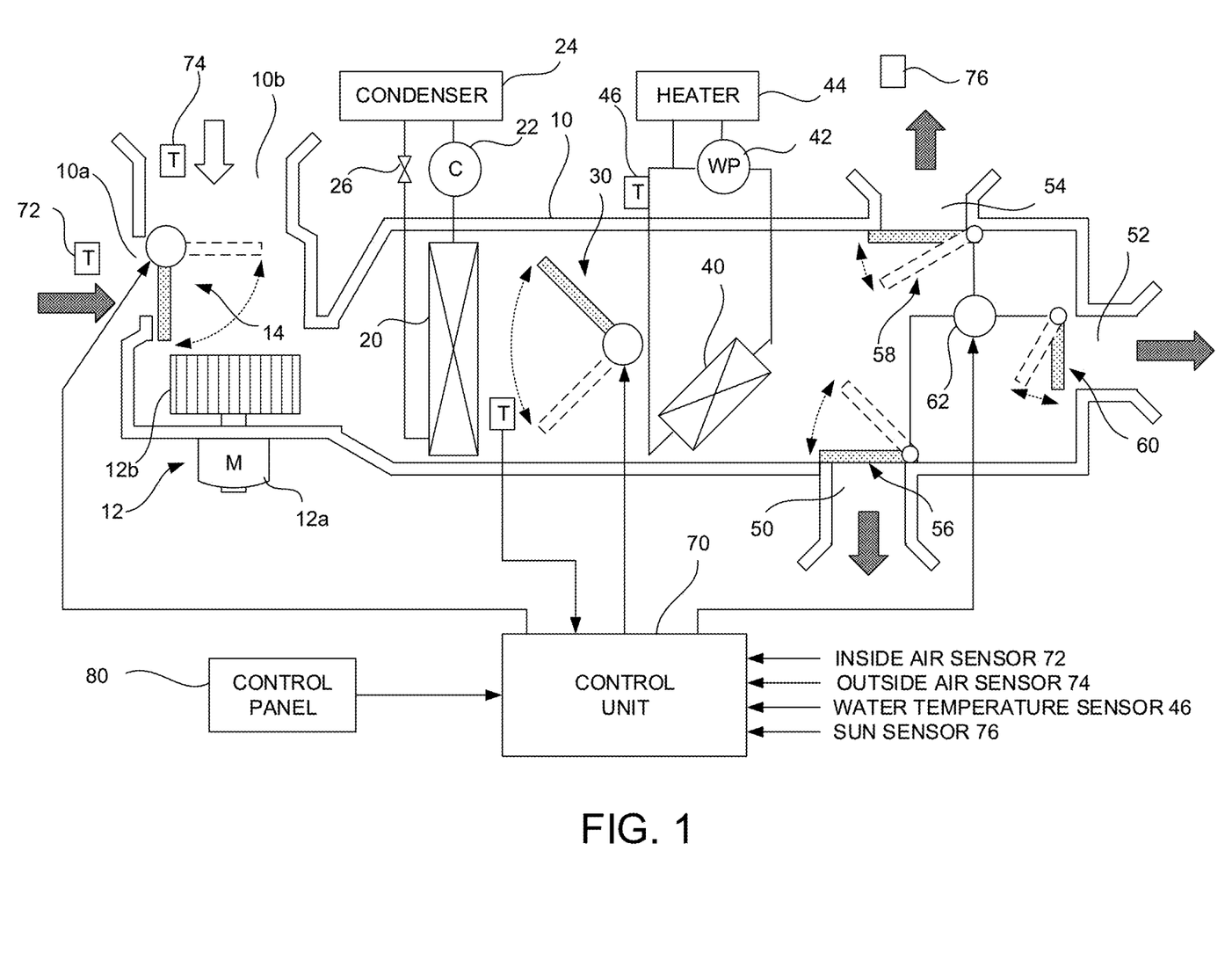
FIG. 1 schematically illustrates one exemplary structure of an air conditioning device for a vehicle, according to an embodiment.

FIG. 1 schematically illustrates one exemplary structure of an air conditioning device for a vehicle according to an embodiment. The air conditioning device includes a ventilation duct 10 having an inside air introducing opening 10a and an outside air introducing opening 10b. The inside air introducing opening 10a is an opening for introducing air from the inside of the cabin, or the interior of the vehicle, specifically, inside air having been introduced through the respective openings defined ahead of and behind the cabin of the vehicle. The outside air introducing opening 10b is an opening for introducing outside air (atmosphere) from the outside of the vehicle through an opening defined, generally, ahead of the vehicle.

The inside air introducing opening 10a and the outside air introducing opening 10b of the ventilation duct 10 have a blower 12 disposed inside the duct. The blower 12 has a fan 12b to be driven by a motor 12a to introduce air (inside air and outside air) through the inside air introducing opening 10a and the outside air introducing opening 10b, respectively, with rotation of the fan 12b. The inside air introducing opening 10a and the outside air introducing opening 10b have a damper 14 disposed inside the duct. The damper 14 adjusts the extent of the opening of each of the inside air introducing opening 10a and the outside air introducing opening 10b to enable adjustment of amount of the inside air in the range between 100% of the inside air (0% of the outside air) and 0% of the inside air (100% of the outside air), depending on the position of the damper 14. Note that a blower 12 and a damper 14 may be provided for each of the inside air and the outside air to enable independent adjustment of the inside air and the outside air.

An evaporator 20 is disposed downstream of the blower 12 in the ventilation duct 10. The evaporator 20 is connected to a compressor 22, a condenser 24, and a depressurizing valve 26, thereby constituting a circulation path. With a heating medium circulating in the circulation path, a heating pump system is constituted. Note that the heating pump system evaporates the heating medium, using the evaporator 20, to thereby remove heat from the air in the ventilation duct 10, and discharges the removed heat via the condenser 24, to thereby cool the interior of the vehicle. Alternatively, as described in JP2010-143533A, a second condenser may be provided to use the discharged heat from the heating pump system in heating. In heating, the compressor 22 may be stopped or the depressurizing valve 26 may be opened so that the target temperature of the evaporator 20 would be set as the room temperature (the inside air temperature). The temperature of the air having passed through the evaporator 20 is measured with a sensor 28. The temperature of the air measured with the sensor 28 can be regarded as the temperature of the interior, or the interior temperature (the inside air temperature).

An air mix damper 30 is disposed downstream of the evaporator 20. The air mix damper 30 is movable between the upper-side closed position and a lower-side closed position. A heater core 40 is disposed in an upper-side path downstream of the air mix damper 30. With the air mix damper 30 in the lower-side closed position, all (100%) of the air flowing in the ventilation duct 10 bypasses the heater core 40. With the air mix damper in the upper-side closed position, on the other hand, all (100%) of the air flowing in the ventilation duct 10 passes through the heater core 40.

The heater core 40 is connected to a pump (WP) 42 and a heater 44, thereby constituting a circulation path and thus a heating system. In this example, water flows in the circulation path as a heating medium. The heater 44 is an electric heater, for example, to heat the circulating water. The temperature of the circulating water is measured with a water temperature sensor 46. The condenser of the heating pump system may be disposed instead of, or in parallel with, the heater 44, to heat the circulating water with the heating pump system.

Three blowing openings, namely a foot-side blowing opening 50, an occupant-side blowing opening 52, and a defrost-side blowing opening 54, are defined downstream of the heater core 40. Specifically, air is blown out from the ventilation duct 10 via the foot-side blowing opening 50 toward the feet of the occupants in the respective driver and passenger seats. Air is blown out toward the upper bodies of the occupants in the respective driver and passenger seats via the occupant-side blowing opening 52. Air is blown out via the defrost-side blowing opening 54 from the bottom to the top of the windshield on the interior-side of the windshield.

The foot-side blowing opening 50 has a foot-side damper 56, the occupant-side blowing opening 52 has an occupant-side damper 60, and the defrost-side blowing opening 54 has a defrost-side damper 58. The dampers enable control of the amount of air to be blown from the ventilation duct 10. Here, in this example, a driving unit 62 controls the opening and closing operation of the foot-side damper 56, the occupant-side damper 58, and the defrost-side damper 60.

The air conditioning device has a control unit 70 for controlling opening and closing of the damper 14, the air mix damper 30, and the three dampers for blowing, and heating with the heater 44. The control unit 70 is supplied with a temperature measured with an inside air sensor 72 provided near the inside air introducing opening 10a, a temperature measured with an outside air sensor 74 provided near the outside air introducing opening 10b, and a temperature measured with the water temperature sensor 46 provided in a water circulation path for supplying water to the heater core 40. A sun sensor 76 is provided near the windshield glass to measure the strength of the outside light entering the interior of the vehicle, and supplies a measured signal to the control unit 70. Further, a control panel 80 is provided to receive an input by an occupant regarding setting of the temperature in the interior of the vehicle, switching between an outside air mode, an inside air mode, and an inside and outside air mixture mode, and selection of the blowing openings. An operation signal is supplied from the control panel 80 to the control unit 70. Note that the control unit 70 can be constituted using a processor for processing inputted data and outputting a control signal.

For introduction of the inside air and the outside air, the inside air mode is a mode in which the outside air introducing opening 10b is fully closed by the damper 14 and the inside air introducing opening 10a is fully opened (the damper 14 at a position indicated with a broken line). The outside air mode is a mode in which the outside air introducing opening 10b is fully opened by the damper 14 and the inside air introducing opening 10a is fully closed (the damper 14 at a position indicated with dots). The inside and outside air mixture mode is a mode intermediate between the inside air mode and the outside air mode.

"Temperature Control"

The control unit 70 controls the damper 14, the air mix damper 30, the heater 44, or the like, based on the values measured by the above-described various sensors. Furthermore, the user may set the target temperature (a set value), setting of either the outside air mode and the inside air mode, and selection of a blowing opening by using the control panel 80.

<Target Blowing Temperature TAO>

The control unit 70 calculates a target blowing temperature TAO, based on the interior temperature (the inside air temperature) TR, a set temperature TSET for the inside air temperature (a set value), values measured with the above-described various sensors, or the like, as follows:

$$TAO = E \times (TSET + \Delta T) - F \times TR - G \times TAM - H \times TS + C$$

Here, TSET represents the set temperature; TR represents the interior temperature (corresponding to the inside air temperature); and TAM represents the outside air temperature; TS represents the amount of insulation; $\Delta T$, C represent correction constants; and E, F, H represent coefficients.

The target blowing temperature TAO is a temperature obtained by subtracting the terms of the outside air temperature TAM and the interior temperature TR from the set temperature TSET with various corrections, such as multiplication with a coefficient, and thus is set higher as the set temperature TSET is higher, and lower as the outside air temperature TAM and the interior temperature TR are higher.

Which blowing opening the air is to be blown through is determined based on the setting on the control panel 80. The amount of air to be blown, or wind allowed to pass, through an opening, is set to an amount set on the control panel 80, if the amount is set on the control panel 80. Alternatively, for automatic setting of the amount of wind, the amount of wind may be determined based on the amount of heat requested to heat the interior of the vehicle, and for example, can be set larger as the target blowing temperature TAO is higher.

Alternatively, the target blowing temperature TAO may be determined with reference to a look-up table, instead of using equations.

<Maximum Heating MAXHOT>

In a case where the amount of heat available to be supplied is insufficient to accomplish the requested level of heating, the control unit 70 determines the state of MAX-HOT, and sets the air mix damper 30 such that all of the air in the duct 10 passes through the heater core 40.

<Setting of Target Water Temperature TWO>

Figure 2:
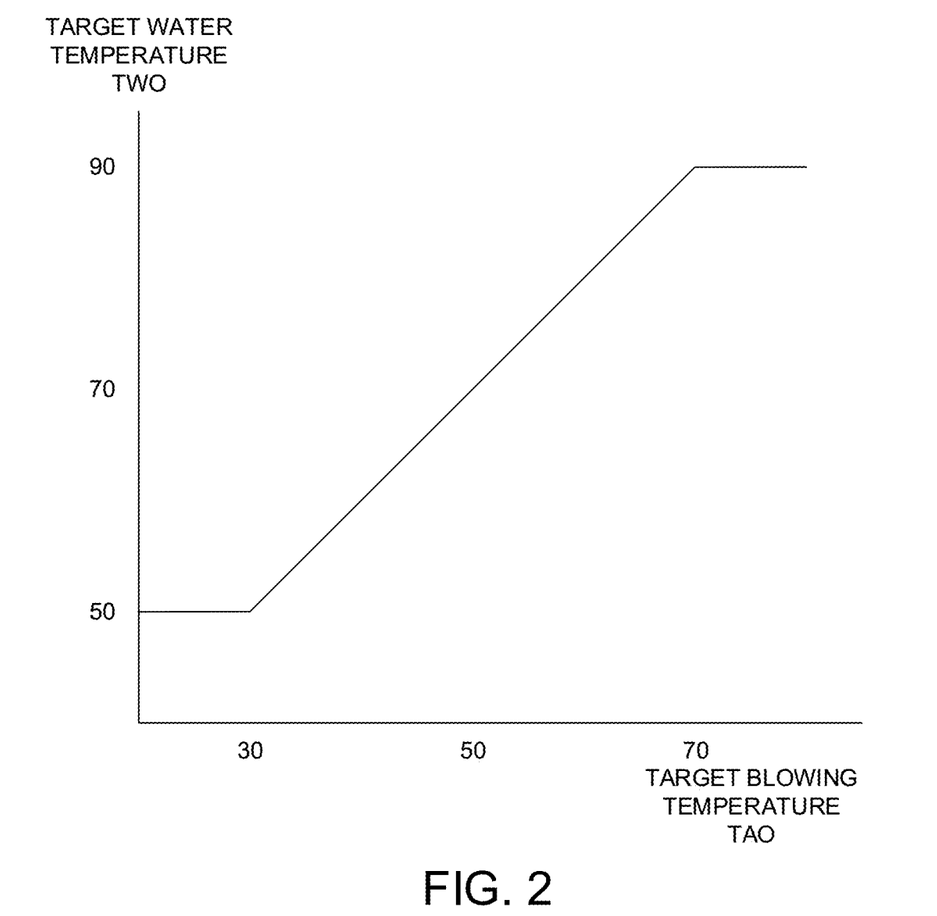
FIG. 2 shows the relationship between a target blowing temperature TAO and a target water temperature TWO.

The target water temperature TWO of the heating medium (water) circulating in the heater core 40 is determined in accordance with the target blowing temperature TAO. That is, in consideration of the efficiency in heat exchange with the heater core 40 and a heat loss to be caused while the air passes through the duct before the air reaches the blowing opening, a temperature slightly higher than the target blowing temperature TAO by a predetermined value, specifically, a temperature obtained by adding a predetermined value to the target blowing temperature TAO, is set as a target water temperature TWO. For example, as illustrated in FIG. 2, the target water temperature TWO is set constant at 50° C. with respect to the target blowing temperature TAO up to 30° C., is set so as to increase in one-to-one correspondence with respect to the target blowing temperature TAO up to 70° C., and is set constant at 90° C. with respect to higher target blowing temperature TAO above 70° C., As described above, the target water temperature TWO is set predetermined extent higher (20° C. in the above-described case) than the target blowing temperature TAO. Note here that the target water temperature TWO is set relatively high as the air mix damper 30 can mix air that has not passed through the heater core 40, and the high temperature water from engine is often available. In this example, a heat loss is calculated based on an assumption that the outside air temperature is 5° C. and the interior temperature is the same. The outside air temperature may be the actually measured temperature, or can be fixed to a typical temperature (for example, 5° C.).

<Setting of Corrected Target Water Temperature TWO2>

As described above, the target water temperature TWO is basically set having a predetermined relationship with respect to the target blowing temperature TAO. The air flowing into the heater core 40 is the air that has passed through the evaporator 20 and is at a temperature equivalent to the room temperature. It is assumed here that the air mix damper 30 can control the amount of air passing through the heater core 40, as described above.

In this embodiment, in a case where all of the air in the duct 10 can be arranged to pass through the heater core 40 on a condition that a required amount of wind can be obtained, the control unit 70 determines the state of MAX-HOT.

With the above, the air mix damper 30 fully closes the upper-side path so that all of the air in the duct 10 is introduced into the heater core 40.

Then, the target water temperature TWO is corrected, based on the real interior temperature, that is, the temperature of the air having passed through the evaporator 20 and measured with the sensor 28 (which can be regarded as the same as the inside air temperature).

For example, the target water temperature TWO is set to 70° C. with respect to the target blowing temperature TAO of 50° C. Then, the difference between the inside air temperature Te (15° C.) and the outside air temperature TAM (5° C.) is subtracted from the obtained target water temperature TWO of 70° C. to thereby calculate a corrected target water temperature TWO2 as 60° C., as follows:

$$TWO2=TWO(70)-(Te(15)-TAM(5))=60$$

With the above, a corrected target water temperature TWO2, or a target water temperature obtained by subtraction in accordance with the inside air temperature, is obtained as 60° C. with respect to the target water temperature TWO of 70° C.

Note here that the target water temperature TWO is temperature based on an assumption that air not passing through the heater core 40 is desirably introduced by the air mix damper 30. The corrected target water temperature TWO2 is temperature when all of the air in the duct 10 is to pass through the heater core 40. The blowing temperature TAO is 50° C. for both the target water temperature TWO and the corrected target water temperature TWO2.

Hence, as described above, it is possible to set the temperature (the temperature of the heat medium) of the heating medium (water) circulating in the heater core 40 lower according to this embodiment, and thus to reduce power consumption by the heater 44.

As described above, use of the corrected target water temperature TWO2 enables reduction in power necessary for heating by about 40%, as described above, when the outside air temperature is 5° C. Consequently, a travelling distance of the vehicle for a given electric charge can be prolonged by about 10%.

In this embodiment, introduction of the outside air and the inside air is adjustable by operating the damper 14. Assuming that the outside air and the inside air are mixed with the inside air rate of a, the following results:

$$TWO2(\text{corrected target water temperature})=TWO\\ (\text{target water temperature})-\alpha(Te(\text{inside air temperature})-TAM(\text{outside air temperature}))$$

Note that the outside air temperature ATM may be either a constant value or an actually measured value.

<Flow of Processing>

Figure 3:
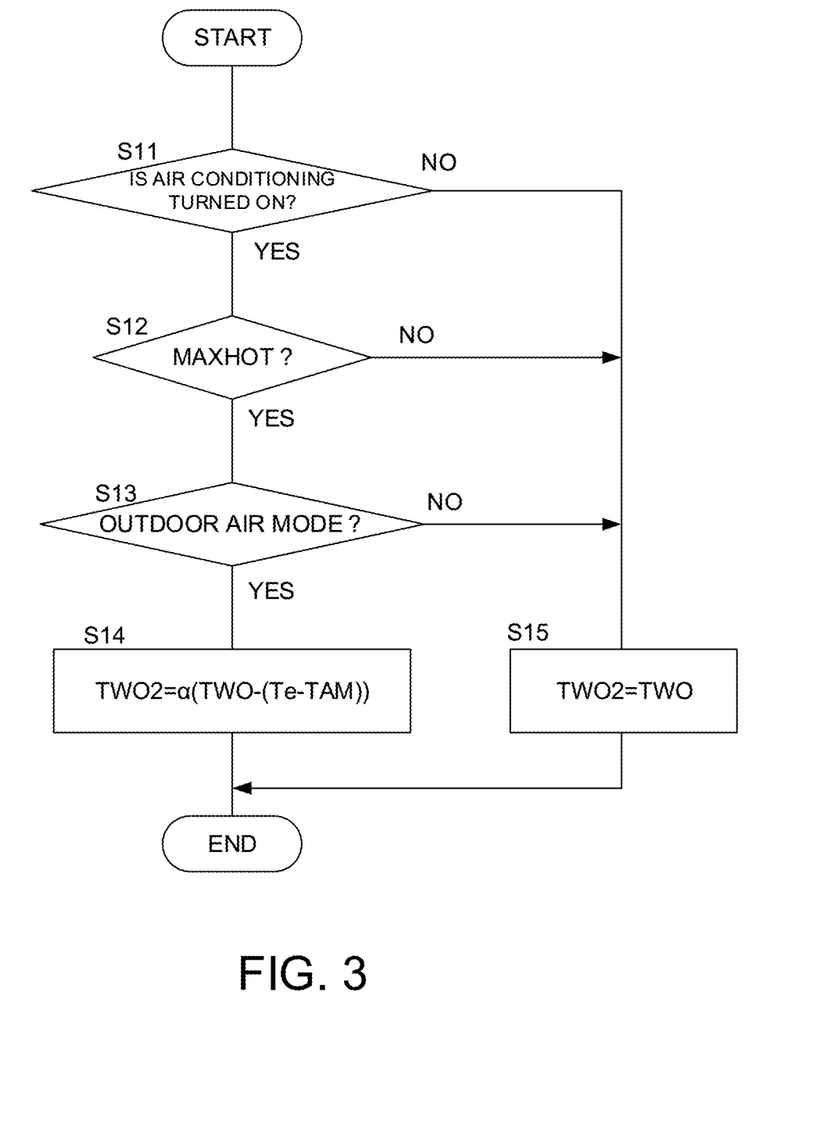
FIG. 3 is a flowchart of a process for setting a corrected target water temperature TWO2 in this embodiment.

FIG. 3 is a flowchart of the process for setting a corrected target water temperature TWO2 in this embodiment.

Initially, whether air conditioning is turned on is determined (S11). With YES in the determination in S11, whether the state is MAXHOT is determined (S12). With YES in the determination in S12, whether the outside air mode is valid is determined (S13). With YES in the determination in S13, a temperature obtained by subtracting a correction value in accordance with the inside air temperature (inside air temperature Te—outside air temperature TAM) is set as a corrected target water temperature TWO2 (S14). Meanwhile, with NO in the respective determinations in S11 to S13, TWO2 is set to TWO (TWO2=TWO) (S15).

With the above, in a case where all of the air in the duct is to pass through the heater core 40, the target water temperature TWO is corrected to the corrected target water temperature TWO2. This makes it possible to set a relatively low target water temperature, while keeping the desired blowing temperature.

<Air Mix Damper>

The operation of the air mix damper 30 will be described. The air mix damper 30 controls the amount of air to pass through the heater core 40. As the target water temperature TWO is set relatively high, as described above, it is possible to obtain a desired target blowing temperature TAO by adjusting the percentage of the air caused to pass through the heater core 40 by the air mix damper 30.

For example, based on the target blowing temperature TAO and the inside air temperature Te, the rate AM, i.e. the rate at which air will pass through the heat core 40 can be determined as follows:

$$AM=(TAO-Te)/(TWO-Te)$$

<Two-layered Flowing Mode>

Figure 4:
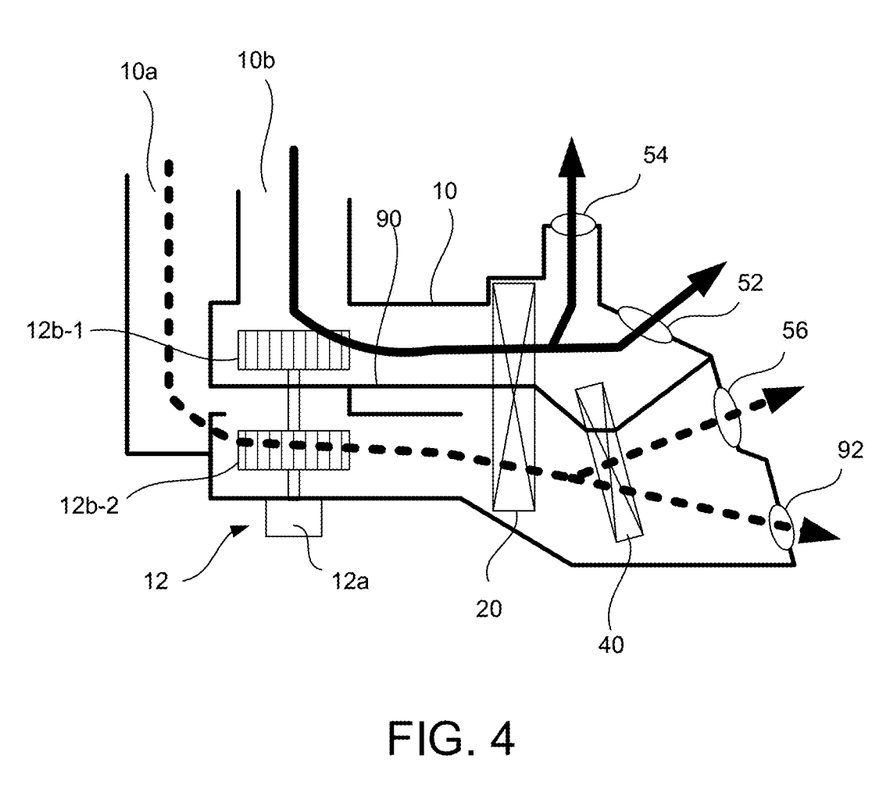
FIG. 4 illustrates a flowing state of outside air and inside air in a two-layered flowing mode.

FIG. 4 illustrates the flowing state of the outside air and the inside air in a two-layered flowing mode. In this example, a partition 90 separates the inside of the duct into an upper layer and a lower layer. The blower 12 has a fan 12*b*-1 for inside air and a fan 12*b*-2 for outside air, which can be independently driven. A blowing opening 92 opened toward the rear seats is provided.

The drawings illustrate a state in which the inside air and the outside air are flowing in a fully separated manner, with the inside air introducing opening, the outside air introducing opening, the respective dampers of the blowing openings, and the air mix damper 30 all being not illustrated. In the structure illustrated in FIG. 4, a damper for mixing the air in the upper layer and the air in the lower layer can be provided to implement a mixture mode in which the inside air and the outside air are mixed. Further, the introduced outside air can be heated with the heater core 40.

In a case where the outside air is blown into the interior of the vehicle without passing through the heater core 40 in the two-layered flowing mode, as illustrated, or in a case where the outside air is partially introduced into the lower layer and all of the air in the lower layer passes through the heater core 40, it is possible to conduct heating using the above-described corrected target water temperature TWO2.

Figure 5:
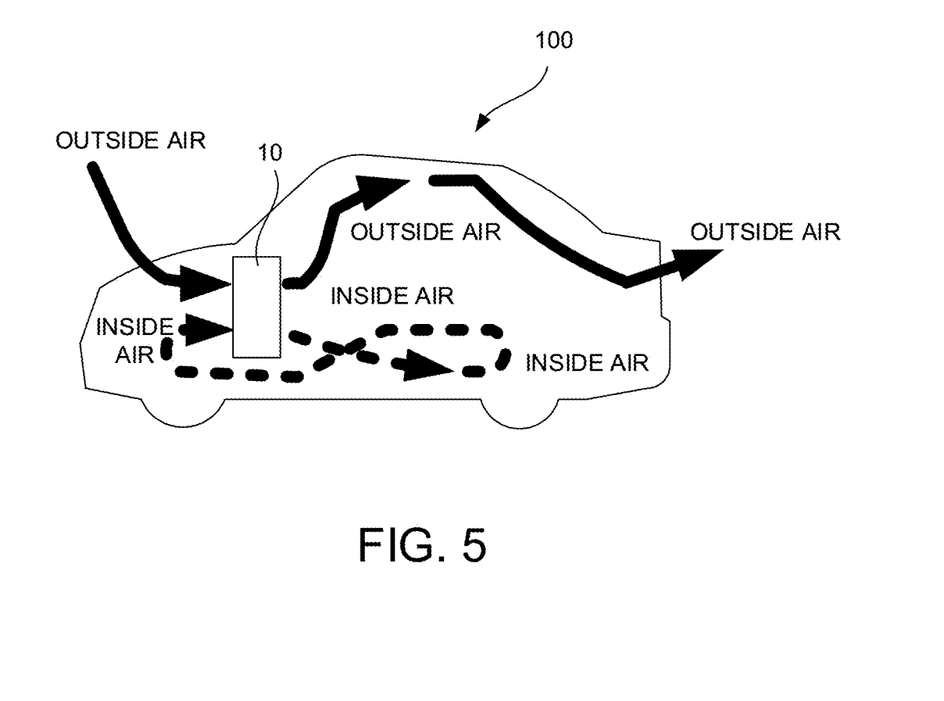
FIG. 5 is a conceptual diagram of a two-layered mode in a vehicle.

FIG. 5 is a conceptual diagram illustrating the two-layered mode of a vehicle 100. Specifically, the outside air flows in the upper portion in the interior of the vehicle, while the inside air circulates in the lower portion in the interior of the vehicle.

The invention claimed is:

1. An air conditioning device for a vehicle, comprising:
   a heat pump system for circulating a first heat medium through an evaporator and a condenser;
   a heating system for circulating a second heat medium through a heater and a heater core;
   a ventilation duct having the evaporator and the heater core disposed therein, and further having an introducing opening formed on one end thereof and a blowing opening formed on another end thereof so that air having been introduced through the introducing opening is blown out through the blowing opening; and
   a control unit for controlling temperature of the first and second heat mediums in the heating system,
   wherein
      the introducing opening includes an outside air introducing opening for introducing air outside a cabin of the vehicle and an inside air introducing opening for introducing air inside the cabin of the vehicle,
      the outside air introduced through the outside air introducing opening is introduced into the ventilation duct in an outside air mode,
      the inside air introduced through the inside air introducing opening is introduced into the ventilation duct in an inside air mode,
      the outside air introduced through the outside air introducing opening and the inside air introduced through the inside air introducing opening are both introduced into the ventilation duct in an inside and outside air mixture mode, and
      in heating the inside of the cabin of the vehicle in either the inside air mode or the inside and outside air mixture mode, the control unit executes control such that all of the air to be blown out through the blowing opening has passed through the heater core, and
   the control unit determines target blowing temperature (TAO) of the air to be blown out through the blowing opening based on inside air temperature (Te) of the inside air, outside air temperature (TAM) of the outside air and target inside air temperature (TSET) of the inside air, and sets target heating medium temperature (TWO) of the second heating medium in the heating system in accordance with the target blowing temperature (TAO), and subtracts a difference between inside air temperature (Te) an outside air temperature (TAM) from the first target temperature (TWO) to change the target heating medium (TWO) to amended target heating medium temperature (TWO2) of the second heating medium, wherein the amended target medium temperature (TWO2) is determined by:

$$TWO2=TWO-(Te-TAM).$$

* * * * *